United States Patent
Hicks

[11] Patent Number: 6,142,202
[45] Date of Patent: Nov. 7, 2000

[54] ANTI-SKID APPARATUS

[76] Inventor: Jerry Hicks, 508 Hamer Rd., Rte. 1, Alma, Ak. 72921

[21] Appl. No.: 09/134,881

[22] Filed: Aug. 15, 1998

[51] Int. Cl.[7] .................................................. B60C 27/10
[52] U.S. Cl. ........................................... 152/218; 152/237
[58] Field of Search .................................... 152/186, 218, 152/217, 231, 236, 237

[56] References Cited

U.S. PATENT DOCUMENTS

| | | | |
|---|---|---|---|
| 1,246,132 | 11/1917 | Mayer et al. | 152/236 |
| 1,474,518 | 11/1923 | Everett . | |
| 1,525,779 | 2/1925 | King . | |
| 1,822,343 | 9/1931 | Gillet | 152/237 |
| 1,995,758 | 3/1935 | Stokke et al. | 152/218 X |
| 1,999,713 | 4/1935 | Bambenek | 152/218 X |
| 2,447,357 | 8/1948 | Mosley | 152/228 |
| 2,449,033 | 9/1948 | Younglove | 152/226 |
| 2,467,654 | 4/1949 | Boje | 152/228 |
| 2,533,151 | 12/1950 | Stevens | 152/237 X |
| 2,572,306 | 10/1951 | Brewton | 152/225 |
| 2,612,202 | 9/1952 | Bumbaugh | 152/225 |
| 2,642,915 | 6/1953 | Jellison | 152/237 |
| 2,692,632 | 10/1954 | Snedeker | 152/225 |
| 3,068,925 | 12/1962 | Stephens | 152/226 |
| 3,109,475 | 11/1963 | Whitman | 152/225 |
| 3,245,451 | 4/1966 | Gellman | 152/225 |
| 4,368,769 | 1/1983 | Rookasin | 152/237 X |
| 5,299,613 | 4/1994 | Maresh | 152/221 |
| 5,309,968 | 5/1994 | Yoshida | 152/219 |
| 5,423,365 | 6/1995 | Labonville | 152/239 |
| 5,632,528 | 5/1997 | Gohrbandt | 301/37.22 |
| 5,641,208 | 6/1997 | Stach | 301/64.1 |
| 5,707,464 | 1/1998 | Poulsen | 152/241 |

FOREIGN PATENT DOCUMENTS

| | | | |
|---|---|---|---|
| 0616910 | 9/1994 | European Pat. Off. . | |
| 76861 | 5/1917 | Switzerland | 152/231 |

*Primary Examiner*—Russell D. Stormer
*Attorney, Agent, or Firm*—Dunlap, Codding & Rogers, P.C.

[57] ABSTRACT

An anti-skid apparatus for a tire is provided. The anti-skid apparatus includes a traction member that is positionable across the tread of the tire and a fastening assembly which is connected to the first and second ends of the traction member and extended through an opening in the wheel on which the tire is mounted. The fastening assembly tightens the traction member to maintain the traction member in engagement with the tread of a tire. A modified tire rim having a passageway extending therethrough for use with the anti-skid apparatus of the present invention is also provided.

14 Claims, 6 Drawing Sheets

ANTI-SKID APPARATUS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to anti-skid devices for tires, and more particularly, but not by way of limitation, to an improved anti-skid apparatus that is easily and quickly secured to a tire without requiring rotation of the tire or the expenditure of significant physical labor. In another aspect, the present invention relates to a modified tire rim for use with the anti-skid apparatus of the present invention.

2. Description of Related Art

The use of tire chains and other devices to increase a vehicle's traction when the vehicle is travelling along ice or snow covered roads is well known. These devices typically include one or more traction units spaced about the tread of the tire. The traction units are often in the form of a length of chain or studded cable and have been secured about the tread of the tire in a variety of different ways. For example, the most common method of securing traction units to a tire is by interconnecting the traction units with a pair of chains or cables which encircle the inner and outer sidewalls of the tire. While these types of devices have proven effective for providing the required traction, the process of installing such tire chains along a roadside is a difficult and often physically taxing task.

To begin, such tire chains are usually installed on a tire in inclement weather, such as snow or ice. Next, the installer must gain access to the inner sidewall of the tire in order to connect the ends of the chain or cable positioned on the inner sidewall of the tire. The problem encountered in doing this is that the installer must generally need to be able to view the ends of the chain or cable to make this connection. Therefore, the installer has to lay on the ground, which is usually covered with snow, ice, or mud, to view the inner sidewall of the tire and make the required connection.

Other anti-skid devices which are of the types that are clamped to the inner and outer sidewall of the tire, have also been proposed. These devices typically include a U-shaped traction member which is positionable over a section of the tire and a clamp assembly for clamping the traction member to either the sidewalls of the tire or the inner and outer portions of the tire rim. The problem experienced with these types of devices is that the clamp assemblies are generally rigid in nature. As such, travel of a vehicle along a road while one of these types of devices is clamped to the tire or the rim can result in significant damage to the tire or the rim.

To this end, a need exists for an improved anti-skid device for a tire that is easy to install and yet will not damage the tire or the rim. It is to such a device that the present invention is directed.

SUMMARY OF THE INVENTION

In one aspect, the present invention is directed to an anti-skid apparatus for a tire. The anti-skid apparatus includes a traction member that is positionable across the tread of the tire and a fastening assembly which is connected to the first and second ends of the traction member and extended through an opening in the wheel on which the tire is mounted. The fastening assembly tightens the traction member to maintain the traction member in engagement with the tread of a tire.

In another aspect, the present invention is directed to a tire rim modified to have a passageway extending therethrough for use with the anti-skid apparatus of the present invention.

DETAILED DESCRIPTION OF THE INVENTION

Figure 1:
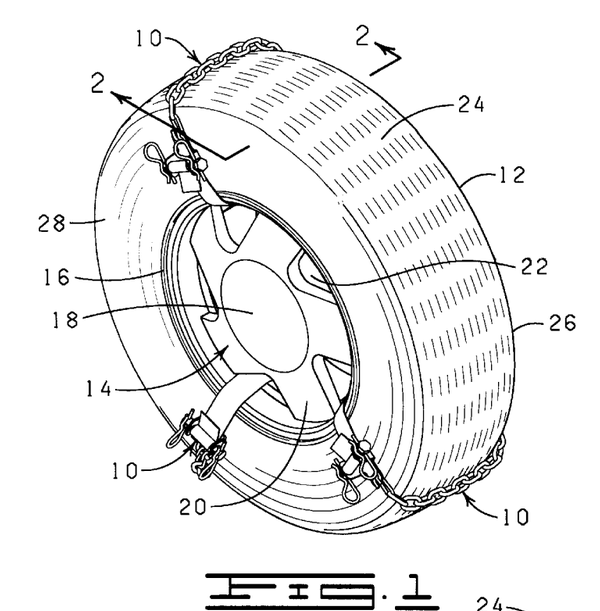
FIG. 1 is a perspective view of a tire mounted on a wheel shown with a plurality of anti-skid apparatuses constructed in accordance with the present invention secured thereto.

Referring now to the drawings, and more particularly to FIG. 1, a plurality of anti-skid apparatuses 10 constructed in accordance with the present invention are shown secured to a tire 12 in a spaced apart relationship for increasing traction and preventing slippage of the tire 12 when the tire 12 is mounted on a vehicle (not shown) travelling along a road covered with ice, snow, or mud.

Figure 2:
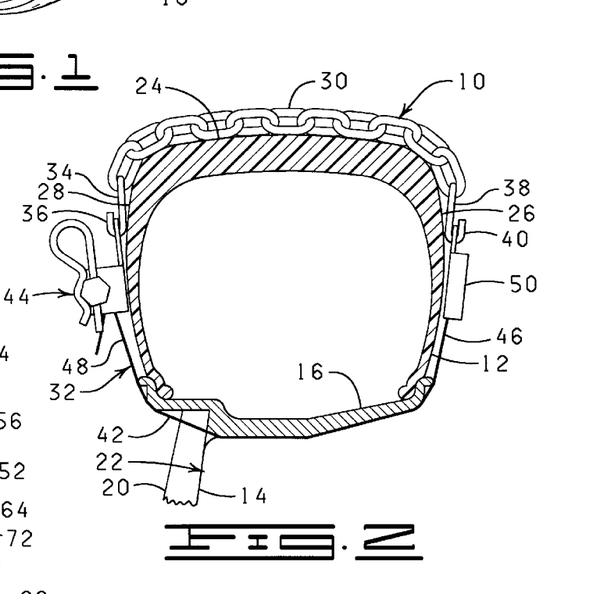
FIG. 2 is a cross-sectional view taken at 2—2 in FIG. 1.

Referring now to FIGS. 1 and 2, the anti-skid apparatuses 10 are primarily intended for use on a tire, such as the tire 12, which is mounted on a wheel 14. The wheel 14 generally includes a rim 16 to which the tire 12 is mounted, a hub 18 through which the axis of rotation of the tire 12 extends, and a flange 20 which interconnects the hub 18 with the rim 16. The flange 20 is typically formed with a plurality of spaced apart openings 22 extending through the flange 20 for the purpose of increasing air flow across the brakes of the vehicle. The tire 12 includes a tread 24, an inner sidewall 26, and an outer sidewall 28.

The anti-skid apparatus 10 of the present invention is adapted to be transversely positioned across the tread 24 of the tire 12 and through one of the openings 22 of the wheel 14 and selectively adjusted for easy installation and removal. The anti-skid apparatus 10 of the present invention includes a traction member 30, which is positionable transversely across the tread 24 of the tire 12 from the inner sidewall 26 to the outer sidewall 28, and a fastening assembly 32 which is extendable through one of the openings 22 of the wheel 14, connected to opposing ends of the traction member 30, and adjustable so as to securely fasten the traction member 30 to the tread 24 of the tire 12.

The traction member 30 is illustrated herein as being a length of chain comprising a plurality of interconnected chain links. However, it will be appreciated by those of ordinary skill in the art that the traction member 30 may be any device suitable for increasing traction on an ice or snow covered road surface. For example, the traction member 30 may be a wire cable or include a series of interconnected studs or spikes.

The traction member 30 is characterized as having a first end 34 defined by a hook shaped link 36 and a second end 38 defined by a hook shaped link 40. The traction member 30 is preferably flexible and provided with a length such that the traction member 30 is positionable across the width of the tread 24 of the tire 12 and extendable over a portion of the inner sidewall 26 and the outer sidewall 28.

The fastening assembly 32 includes a flexible strap 42 and a cinching assembly 44. The flexible strap 42 has a first end 46 and a second end 48. The first end 46 is adapted to be connected to the second end 38 of the traction member 30. More particularly, the first end 46 of the flexible strap 42 is provided with a hook receiving member 50 (FIG. 2) which may be in the form of a reinforcing member attached to the flexible strap 42 (as illustrated in FIG. 2) or merely a loop or hole formed in the first end 46 of the flexible strap 42 for receiving the hook shaped link 40 of the traction member 30. The second end 48 of the flexible strap 42 is connected to the first end 34 of the traction member 30 by the cinching assembly 44.

To prevent the anti-skid apparatus 10 from being dislodged from the tire 12 while in use, it is preferable that the flexible strap 42, as well as the traction member 30, be fabricated of a substantially inelastic material, thereby preventing the anti-skid apparatus 10 from being expanded while in use. The flexible strap 42 illustrated in FIGS. 1–5 is shown to be fabricated of a web of cloth similar to that used in the manufacture of seatbelts for automobiles and airplanes.

Figure 3:
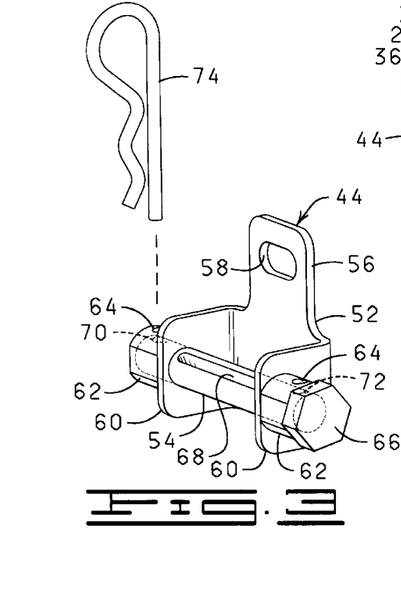
FIG. 3 is a perspective view of a cinch assembly.

Referring now to FIG. 3, the cinching assembly 44 includes a frame 52 and a spool 54 rotatably supported by the frame 52. The frame 52 includes a tongue portion 56 having a hook receiving hole 58. The frame 52 further includes a pair of spaced apart ears 60, each of which is provided with an outwardly extending collar 62. Each of the collars 62 is provided with a pin receiving opening 64 extending therethrough. The spool 54 is provided with a hex shaped head 66, an elongated slot 68 extending therethrough, and a pair of pin receiving openings 70 and 72. The pin receiving openings 70 and 72 are formed at opposing ends of the spool 54 so as to be alignable with the pin receiving openings 64 of the collars 62. As best shown in FIG. 3, the spool 54 is rotatably supported by the collars 62 with the elongated slot 68 disposed between the ears 60 of the frame 52.

Figure 4:
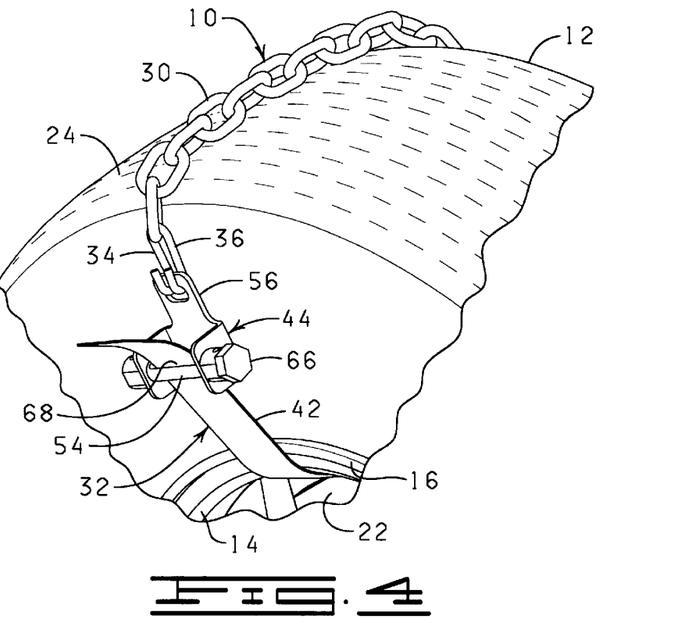
FIG. 4 is a perspective view of a portion of the tire illustrating the attachment of the anti-skid apparatus of the present invention to the tire.

To install the anti-skid apparatus 10 on the tire 12, the first end 46 of the flexible strap 42 is connected to the second end 38 of the traction member 30. The traction member 30 is positioned transversely across the tread 24 of the tire 12 at a location radially outward from one of the openings 22 of the wheel 14. The second end 38 of the flexible strap 42 is then threaded through the opening 22. The frame 52 of the cinching assembly 44 is connected to the first end 34 of the traction member 30 by placing the tongue 56 on the hook shaped link 36. The second end 48 of the flexible strap 42 is then threaded through the slot 68, as illustrated in FIG. 4, and the spool 54 is rotated by applying a torque to the head 66 with a suitable tool, such as a wrench. The spool 54 is rotated so as to wind a portion of the flexible strap 42 onto the spool 54 and thereby placing the flexible strap 42 and the traction member 30 in tension to maintain the traction member 30 in engagement with the tread 24 of the tire 12.

Figure 5:
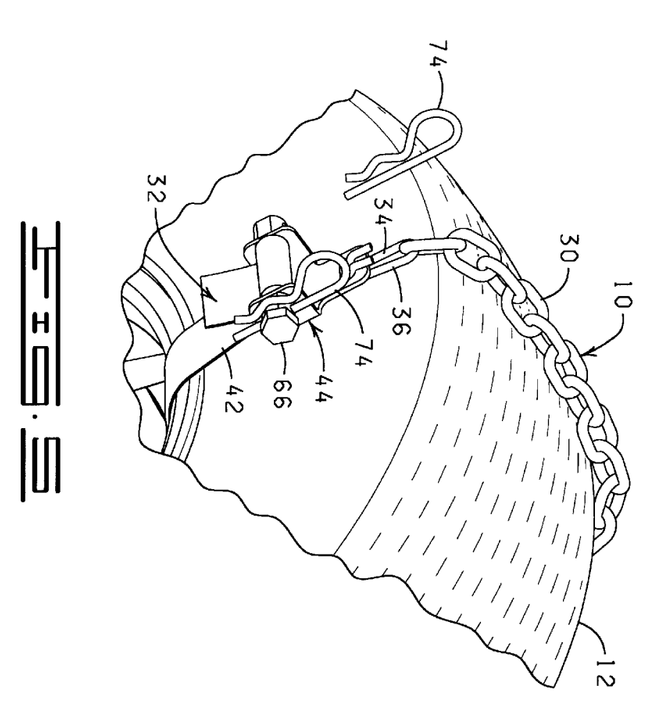
FIG. 5 is a perspective view of a portion of the tire further illustrating the attachment of the anti-skid apparatus of the present invention to the tire.

A pair of retaining pins 74 is utilized to retain the spool 54 in a tightened condition. The retaining pins 74 are inserted through the pin receiving openings 64, 70, and 72 upon the pin receiving openings 64 being aligned with the pin receiving openings 70 and 72. To remove the anti-skid apparatus 10 from the tire 12, the retaining pins 74 are removed from the pin receiving openings 64, 70, and 72 and the spool 54 is allowed to rotate in the opposite direction thereby releasing the tension of the flexible strap 42 and the traction member 30 so that the cinching assembly 44 may be unhooked from the traction member 30 and the anti-skid apparatus 10 removed from the tire 12.

Figure 6:
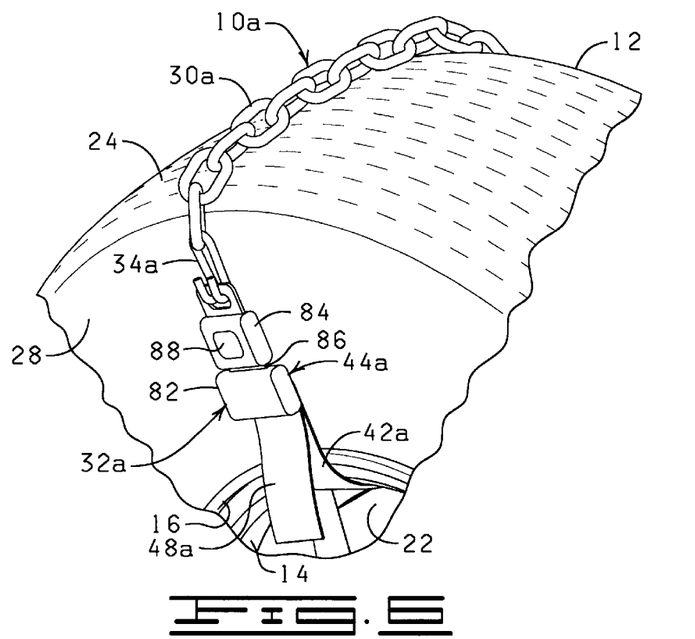
FIG. 6 is a perspective view of the tire illustrating another embodiment of the anti-skid apparatus constructed in accordance with the present invention.

FIG. 6 illustrates another embodiment of an anti-skid apparatus 10a constructed in accordance with the present invention. The anti-skid apparatus 10a includes a traction member 30a and a fastening assembly 32a. The traction member 30a is illustrated in FIG. 6 as being a length of chain comprising a plurality of interconnected chain links. However, it will be appreciated by those of ordinary skill in the art that the traction member 30a may be any device suitable for increasing traction on an ice or snow covered road surface.

The traction member 30a is characterized as having a first end 34a and a second end (not shown). The traction member 30a is preferably flexible and provided with a length such that the traction member 30a is positionable across the width of the tread 24 of the tire 12 and extendable over a portion of the inner sidewall 26 and the outer sidewall 28.

The fastening assembly 32a includes a flexible strap 42a and a cinching assembly 44a. The flexible strap 42a has a first end (not shown and a second end 48a. The first end is adapted to be connected to the second end of the traction member 30a in a manner similar to that described above in reference to the anti-skid apparatus 10. The second end 48a of the flexible strap 42a is connected to the first end 34a of the traction member 30a by the cinching assembly 44a.

The cinching assembly 44a is in the form of an adjustable buckle. More specifically, the cinching assembly 44a includes a strap retaining member 82 to which the second end 48a of the flexible strap 42a is cinchably connected and a catch member 84 adapted to be connected to the first end 34a of the traction member 30a and to releasably receive a portion of the strap retaining member 82.

In the installation of the anti-skid apparatus 10a, the first end of the flexible strap 42a is connected to the second end of the traction member 30a. The traction member 30a is positioned transversely across the tread 24 of the tire 12 at a location radially outward from one of the openings 22 of the wheel 14. The combination of the flexible strap 42a and the strap retaining member 82 of the cinching assembly 44a is then threaded through the opening 22. A plate portion 86 of the strap retaining member 82 is then inserted into the catch member 84, and the second end 48a of the flexible strap 42a is pulled thereby placing the flexible strap 42a and the traction member 30a in tension so as to maintain the traction member 30a in engagement with the tread 24 of tire 24.

To remove the anti-skid apparatus 10a from the tire 12, the strap retaining member 82 is released from the catch member 84 by pressing a release button 88 provided on the catch member 84, thereby releasing the tension of the flexible strap 42a and the traction member 30a so that the cinching assembly 44a may be unhooked from the traction member 30a and the anti-skid apparatus 10a removed from the tire 12.

Figure 7:
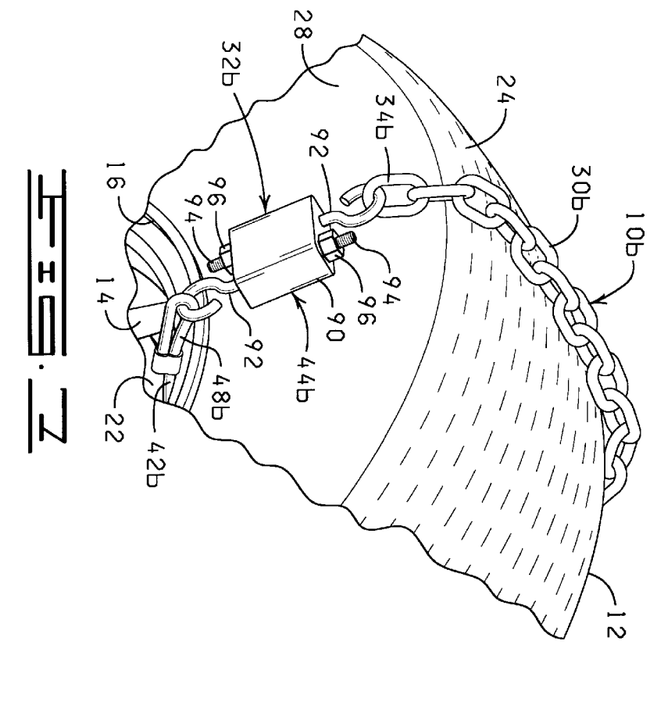
FIG. 7 is a perspective view of a portion of the tire illustrating yet another embodiment of an anti-skid apparatus constructed in accordance with the present invention.

FIG. 7 illustrates another embodiment of an anti-skid apparatus 10b constructed in accordance with the present invention. The anti-skid apparatus 10b includes a traction member 30b and a fastening assembly 32b. The traction member 30b is illustrated in FIG. 7 as being a length of chain comprising a plurality of interconnected chain links. However, it will be appreciated by those of ordinary skill in the art that the traction member 30b may be any device suitable for increasing traction on an ice or snow covered road surface.

The traction member 30b is characterized as having a first end 34b and a second end (not shown). The traction member 30b is preferably flexible and provided with a length such that the traction member 30b is positionable across the width of the tread 24 of the tire 12 and extendable over a portion of the inner sidewall 26 and the outer sidewall 28.

The fastening assembly 32b includes a flexible strap 42b and a cinching assembly 44b. The flexible strap 42a is illustrated as being a wire cable with looped ends. To prevent marring of the wheel 14 when the anti-skid apparatus 10b is in use, the wire cable is preferably plastic coated. The flexible strap 42b has a first end (not shown) and a second end 48b. The first end is adapted to be connected to the second end of the traction member 30b in a manner similar to that described above in reference to the anti-skid apparatus 10. The second end 48b of the flexible strap 42b is connected to the first end 34b of the traction member 30b by the cinching assembly 44b.

The cinching assembly 44b is illustrated as being generally in the form of a turnbuckle. More specifically, the cinching assembly 44b includes a housing 90 and a pair of hooks 92 extending through the housing 90 in opposing directions, as substantially shown in s FIG. 7. Each hook 92 has a threaded shaft 94 with a nut 96 disposed thereon.

In the installation of the anti-skid apparatus 10b, the first end of the flexible strap 42b is connected to the second end of the traction member 30b. The traction member 30b is positioned transversely across the tread 24 of the tire 12 at a location radially outward from one of the openings 22 of the wheel 14. The flexible strap 42b is then threaded through the opening 22. One of the hooks 92 is connected to the first end 34b of the traction member 30b and the other hook 92 receives the second end 48b of the flexible strap 42b. The nuts 96 are then rotated with a suitable tool so as to cause the first end 34b of the traction member 30b to be drawn toward the second end 48b of the flexible strap 42b, thereby placing the flexible strap 42b and the traction member 30b in tension so as to maintain the traction member 30b in engagement with the tread 24 of tire 12.

To remove the anti-skid apparatus 10b from the tire 12, the nuts 96 are rotated in an opposite direction, thereby releasing the tension of the flexible strap 42b and the traction member 30b so that the cinching assembly 44b may be unhooked from the traction member 30b and the anti-skid apparatus 10b removed from the tire 12.

Figure 8:
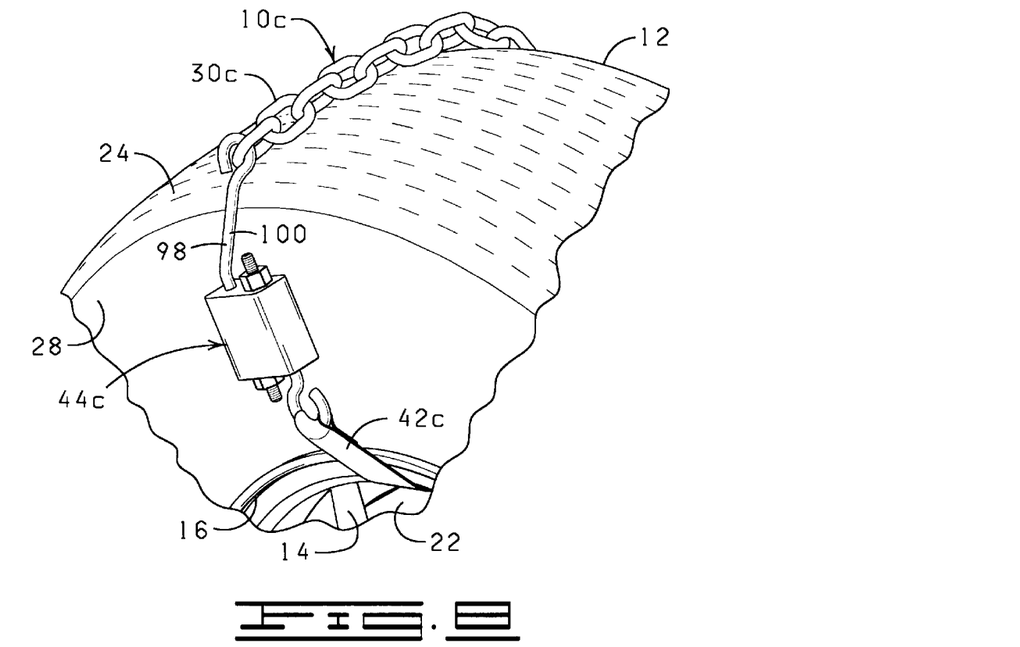
FIG. 8 is a perspective view of a portion of the tire illustrating another embodiment of an anti-skid apparatus constructed in accordance with the present invention.

FIG. 8 illustrates another embodiment of an anti-skid apparatus 10c constructed in accordance with the present invention. The anti-skid apparatus 10c is similar in construction to the anti-skid apparatus 10b described above with the exception that a flexible strap 42c is illustrated as being fabricated of a web of cloth and the cinching assembly 44c is modified relative to the cinching assembly 44b. More specifically, the cinching assembly 44c includes a hook 98 having an angled shaft 100. The shaft 100 is angled such that the cinching assembly 44c and the traction member 30c are able to be positioned closer to the outer sidewall 28 of the tire 12 so as not to be obtrusive when the anti-skid apparatus 10c is in use.

Figure 9:
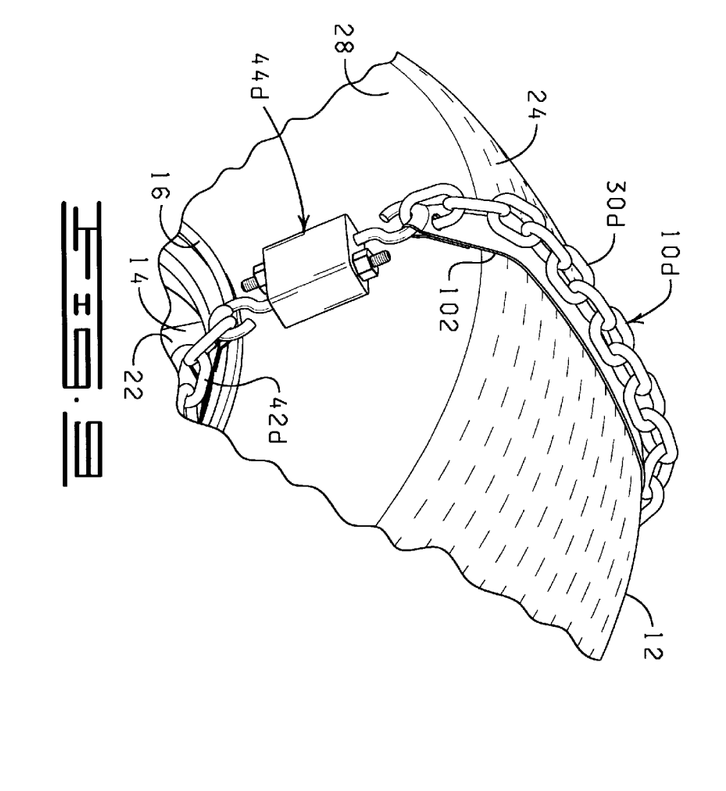
FIG. 9 is a perspective view of the tire illustrating another embodiment of an anti-skid apparatus constructed in accordance with the present invention.

FIG. 9 illustrates another embodiment of an anti-skid apparatus 10d constructed in accordance with the present invention. The anti-skid apparatus 10d is similar in construction to the anti-skid apparatus 10b described above with the exception that a flexible strap 42d is illustrated as being an extension of the traction member 30d. That is, the traction member 30d is provided with a length such that the traction member 30d extends from the outer sidewall 28, transversely across the tread 24 of the tire 12, across the inner sidewall 26, and through the opening 22 of the wheel 14. The ends of the traction member 30d are connected to one another by the cinching assembly 44d which is illustrated in FIG. 9 as being identical in construction to the cinching assembly 44c illustrated in FIG. 8.

The anti-skid apparatus 10d further includes a protective strap 102 having each of its ends connected to the cinching assembly 44d. The protective strap 102 is positioned between the tire 12 and the traction member 30d to prevent damage to the tire 12 and between the wheel 14 and the traction member 30d to prevent damage to the wheel 14.

As described above, the anti-skid apparatuses 10–10d are installed at a location on the tire corresponding with one of the openings 22 of the wheel 14. While the installation of three anti-skid apparatuses 10 is shown in FIG. 1, it will be appreciated that the number of anti-skid apparatuses 10 that may be installed on a tire is generally limited by the number of openings 22 formed in the wheel 14. However, because wheels are manufactured in many different styles and sizes, not all wheels are provided with a sufficient number of openings to permit a sufficient number of anti-skid apparatuses 10 to be installed on the tire to effect the desired traction. To this end, it may be desirable to manufacture certain wheels, particularly those having only zero to three openings, with openings for receiving the anti-skid apparatuses 10 of the present invention and which will not significantly affect the aesthetic appearance of the wheel.

Figure 10:
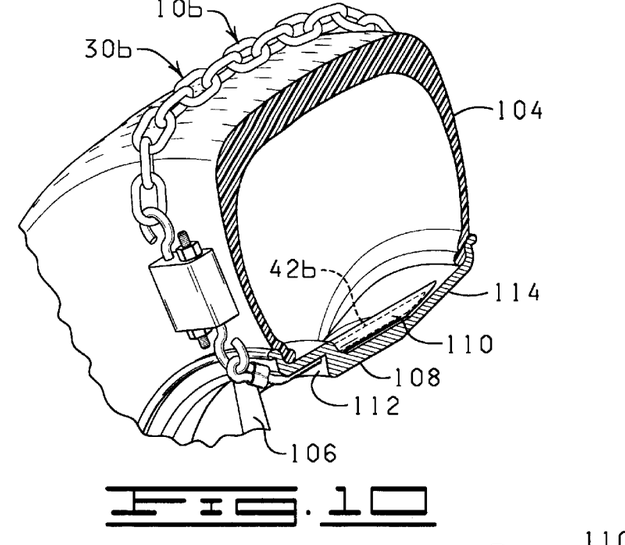
FIG. 10 is a partially cross-sectional, perspective view of a tire attached to a rim constructed in accordance with the present invention and having the anti-skid apparatus of FIG. 7 secured thereto.
Figure 10A:
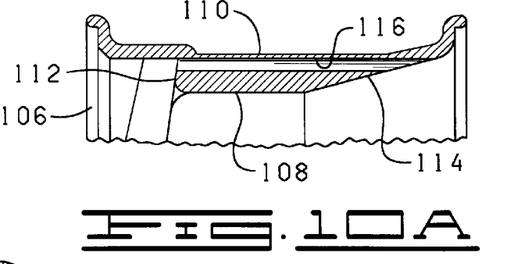
FIG. 10A is a sectional view of a portion of the rim of FIG. 10.

Referring now to FIGS. 10 and 10A, the anti-skid apparatus 10b, described above in reference to FIG. 7, is shown in FIG. 10 positioned on a tire 104 which is mounted on a wheel 106. The wheel 106 is substantially identical to the wheel 14 described above with the exception that the wheel 106 is provided with a rim 108 which has been modified relative to the rim 16 of the wheel 14.

In particular, the rim 108 is provided with a plurality of tubes 110 (only one tube 110 illustrated in FIGS. 10 and 10A) spaced circumferentially about the rim 108 and extending between an outer side 112 of the rim 108 and an inner side 114 of the rim 108. The tubes 110 define a passageway 116 for receiving the flexible strap 42b and holding the flexible strap 42b in a stable relationship relative to the rim 108.

Figure 11:
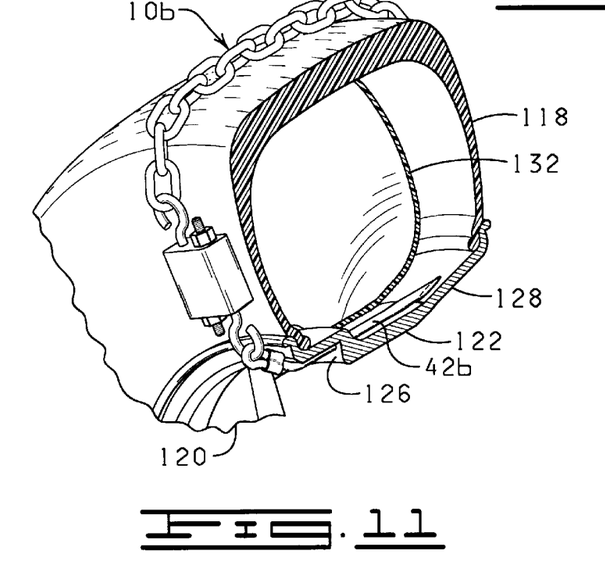
FIG. 11 is a partially cross-sectional, perspective view of a tire attached to a rim constructed in accordance with the present invention and having the anti-skid apparatus of FIG. 7 secured thereto.
Figure 11A:
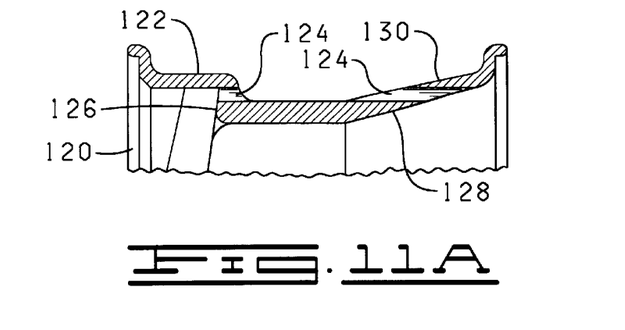
FIG. 11A is a sectional view of a portion of the rim of FIG. 11.

FIG. 11 illustrates the anti-skid apparatus 10b positioned on a tire 118 mounted on a wheel 120. The wheel 120 includes a rim 122 that is similar to the rim 108 of the wheel 106 with the exception that the rim 122 is not provided with a tube as is the rim 108. Instead, the rim 122 is provided with a plurality of passageways 124 (only one passageway 124 illustrated in FIGS. 11 and 11A) spaced circumferentially about the rim 122 and extending between an outer side 126 and an inner side 128 of the rim 122 such that the passageway 124 intersects with an outward surface 130 of the rim 122. Accordingly, an inner tube 132 is required to inflate the tire 118 in order to isolate the passageway 124 from the air used to inflate the tire 118. Nevertheless, the passageway 124 functions to 20 receive and maintain the flexible strap 42b in a stable relationship relative to the rim 122.

Figure 12:
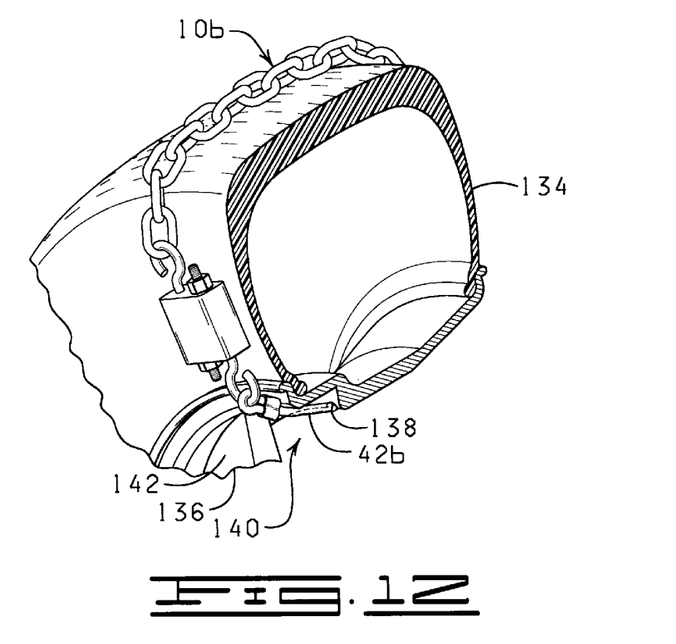
FIG. 12 is a partially cross-sectional, perspective view of a tire attached to a rim constructed in accordance with the present invention and having the anti-skid apparatus of FIG. 7 secured thereto.
Figure 12A:
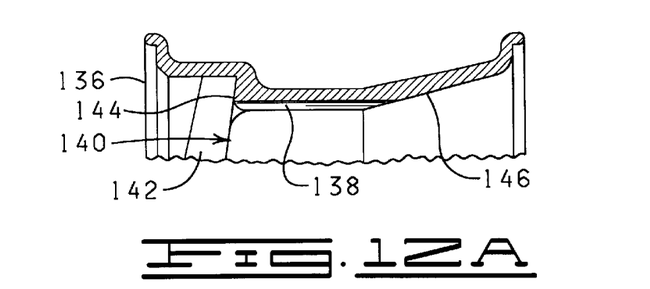
FIG. 12A is a sectional view of a portion of the rim of FIG. 12.

FIG. 12 illustrates the anti-skid apparatus 10b positioned on a tire 134 which is mounted to a wheel 136. The wheel 136 is substantially identical in construction to the wheel 14 shown in FIGS. 1–9 with the exception that the wheel 136 is modified by forming a notch or groove 138 in the surface forming an opening 140 in a flange 142 of the wheel 136. The notch 138 is formed so as to extend from an outer side 144 of the flange 142 to an inner side 146 of the flange 142 and is formed in the most radially outward portion of the opening 140 for receiving the flexible strap 42b and maintain the flexible strap 42b in a stable position relative to the wheel 136 when the anti-skid apparatus 10b is in use.

It should be appreciated that the passageways 116 and 124, as well as the notch 138 of the wheels 106, 120, and 136, respectively, may be sized and shaped to receive any of the types of flexible straps described herein, as well as those not specifically mentioned herein. In addition, it should be appreciated that any combination of the flexible straps and cinching assemblies described above may be utilized to form an anti-skid apparatus constructed in accordance with the present invention.

An advantage of the anti-skid apparatuses disclosed herein is that each of the anti-skid apparatuses may be quickly and easily installed on a tire regardless of road and weather conditions. For example, it should be appreciated that the anti-skid apparatuses described herein may be installed on a tire even though the tire may be buried in snow or mud. Another advantage of the anti-skid apparatuses of the present invention is that they may be utilized on a tire without significantly damaging the tire or corresponding wheel.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An anti-skid apparatus in combination with a tire having a tread, an inner sidewall, and an outer sidewall and mounted on a wheel which includes a rim on which the tire is mounted and a hub connected to the rim by a flange having at least one opening extending therethrough, the rim of the wheel having a notch extending from an outer side of the wheel to an inner side of the wheel and in communication with the opening of the flange, the anti-skid apparatus comprising:

> a traction member having a first end and a second end and positioned transversely across the tread of the tire from the inner sidewall to the outer sidewall; and
>
> fastening means connected to the first and second ends of the traction member and extending through the opening of the rim for fastening the traction member to the tread of the tire, the fastening means comprising:
>
>> a flexible strap having a first end and a second end, the flexible strap positioned through the opening of the rim and in the notch of the rim with the first end of the strap connected to the second end of the traction member; and
>>
>> cinching means connected to the first end of the traction member and the second end of the strap for adjustably tightening the strap and the traction member to maintain the traction member in engagement with the tread of the tire,
>
> wherein the notch of the rim is dimensioned to retain the strap when the strap is tightened and received in the notch.

2. The combination of claim 1 wherein the strap is substantially inelastic.

3. The combination of claim 1 wherein the strap is fabricated of cloth.

4. The combination of claim wherein the strap is a wire cable.

5. The combination of claim 4 wherein the wire cable is plastic coated.

6. The combination of claim 1 wherein the strap is a length of chain comprising a plurality of interconnected chain links.

7. The combination of claim 6 wherein the fastening means further comprises a protective strap positioned between the wheel and the strap to prevent damage to the wheel.

8. An anti-skid apparatus in combination with a tire having a tread, an inner sidewall, and an outer sidewall and mounted on a wheel which includes a rim on which the tire is mounted and a hub connected to the rim by a flange, the rim having a passageway extending from an outer side of the rim to an inner side of the rim, the passageway of the rim intersecting an outward surface of the rim and an inner tube disposed in the tire to isolate the passageway of the rim from air disposed in the inner tube for inflating the tire, the anti-skid apparatus comprising:

> a traction member having a first end and a second end and positioned transversely across the tread of the tire from the inner sidewall to the outer sidewall; and
>
> fastening means connected to the first and second ends of the traction member and extending through the passageway of the rim for fastening the traction member to the tread of the tire, the fastening means comprising:
>
>> a flexible strap having a first end and a second end, the flexible strap positioned through the passageway of the rim with the first end of the strap connected to the second end of the traction member; and cinching means connected to the first end of the traction member and the second end of the strap for adjustably tightening the strap and the traction member to maintain the traction member in engagement with the tread of the tire.

9. The combination of claim 8 wherein the strap is substantially inelastic.

10. The combination of claim 8 wherein the strap is fabricated of cloth.

11. The combination of claim 8 wherein the strap is a wire cable.

12. The combination of claim 11 wherein the wire cable is plastic coated.

13. A method of increasing traction and preventing slippage of a tire having a tread, an inner sidewall, and an outer sidewall and mounted on a wheel which includes a rim on which the tire is mounted and a hub connected to the rim by a flange having an opening extending therethrough, the rim having a passageway extending from an outer side of the rim to an inner side of the rim, the passageway of the rim intersecting an outward surface of the rim, an inner tube being disposed in the tire to isolate the passageway of the rim from air disposed in the inner tube for inflating the tire, the method comprising:

positioning a traction member transversely across the tread of the tire;

attaching a flexible strap to one end of the traction member;

threading the other end of the strap through the passageway in the rim of the wheel;

connecting the strap to the other end of the traction member; and tightening the strap and the traction member to maintain the traction member in engagement with the tread of the tire.

14. A method of increasing traction and preventing slippage of a tire having a tread, an inner sidewall, and an outer sidewall and mounted on a wheel which includes a rim on which the tire is mounted and a hub connected to the rim by a flange having an opening extending therethrough, the rim having a notch extending from an outer side of the rim to an inner side of the rim and in communication with the opening of the flange, the method comprising:

positioning a traction member transversely across the tread of the tire;

attaching a flexible strap to one end of the traction member;

positioning the other end of the strap in the notch of the rim;

connecting the strap to the other end of the traction member; and tightening the strap and the traction member to maintain the traction member in engagement with the tread of the tire.

* * * * *